United States Patent
Sherman et al.

[11] Patent Number: 5,947,480
[45] Date of Patent: Sep. 7, 1999

[54] SEALING UNIT FOR ROTATING SHAFT

[75] Inventors: Alex Sherman, Cherry Hill; John W. Shoffner, Jr., Woodbury Heights; Douglas K. Parenteau, Wenonah, all of N.J.; Lee W. Mayer, Centreville, Md.

[73] Assignee: K-Tron Technologies, Inc., Wilmington, Del.

[21] Appl. No.: 08/918,425

[22] Filed: Aug. 26, 1997

[51] Int. Cl.⁶ ........................................... F16J 15/16
[52] U.S. Cl. ........................................ 277/375; 277/369
[58] Field of Search .............................. 277/361, 369, 277/372, 377, 371, 374, 375, 379, 407

[56] References Cited

U.S. PATENT DOCUMENTS

| | | | |
|---|---|---|---|
| 2,467,960 | 4/1949 | Brady, Jr. | |
| 2,672,357 | 3/1954 | Voytech | 277/369 |
| 3,079,605 | 2/1963 | Thomas et al. | 277/369 |
| 3,090,627 | 5/1963 | Tankus | 277/396 |
| 3,090,629 | 5/1963 | Lee et al. | |
| 4,098,515 | 7/1978 | Sakata | 277/406 |
| 4,217,980 | 8/1980 | Kemp, Jr. | 198/666 |
| 4,361,334 | 11/1982 | Amorese et al. | 277/405 |
| 4,377,290 | 3/1983 | Netzel | 277/368 |
| 4,427,204 | 1/1984 | Alley | 277/372 X |
| 4,522,410 | 6/1985 | Holzer | |
| 4,596,394 | 6/1986 | Schmitt | 277/374 X |
| 4,645,067 | 2/1987 | George | 198/666 |
| 5,263,572 | 11/1993 | Hove | 198/672 |
| 5,294,132 | 3/1994 | Duffee et al. | 277/358 |
| 5,356,158 | 10/1994 | Simmons et al. | 277/402 |
| 5,409,240 | 4/1995 | Ballard | 277/366 |

*Primary Examiner*—Lynne Reichard
*Assistant Examiner*—Greg Binda
*Attorney, Agent, or Firm*—Ratner & Prestia

[57] ABSTRACT

A sealing unit for sealing an opening through which a rotating part passes. A rotary ring turns within a housing when a pair of flexible rings carried by the rotary ring are turned by engagement with a rotating part. The opposed faces of the rotary rings are in sliding contact with surfaces having mineral filled low friction layers. The sliding contact between the rotary ring and the surfaces having mineral filled low friction layers is established and maintain by a spring.

13 Claims, 1 Drawing Sheet

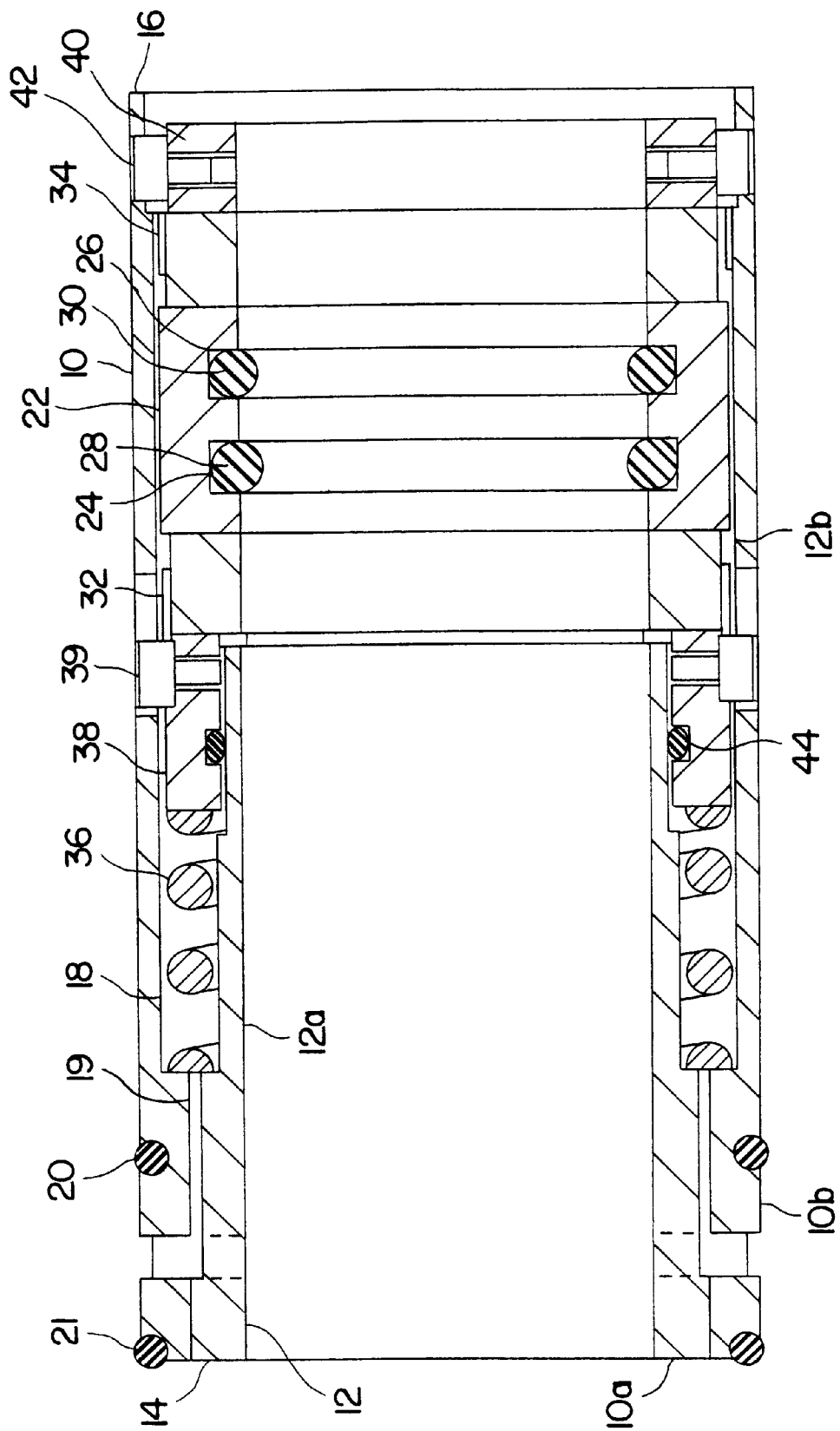

SEALING UNIT FOR ROTATING SHAFT

TECHNICAL FIELD

The present invention relates, in general, to sealing an opening through which a rotating part passes and, in particular, to sealing an opening in a bowl in a materials feeder through which a rotating feed screw passes for feeding material from the bowl in metered quantities.

BACKGROUND OF THE INVENTION

Materials feeders typically include a bowl in which material is contained. A rotating feed screw which passes through the bowl feeds the material in metered quantities through an opening at the bottom of the bowl to utilization equipment.

It is important to seal the opening in the bowl through which the feed screw passes to avoid escape of material, particularly abrasive and floodable materials, contained in the bowl. Among the criteria for sealing units in such an application are:

(1) acceptable for feeding solids and powders such as food products, extremely abrasive materials and extremely free-flowing materials, (2) compatible with materials feeders already in use, (3) quick and easy feed screw replacement, (4) sealing must be effected without lubrication, and (5) operation at temperatures below 140° F.

Various commercially available sealing units fail to provide seals which sufficiently contain the materials in the bowl. The main factors which cause leakage of material through a faulty sealing unit are the head load of the material in the bowl and an extension hopper positioned above the bowl, and the forces resulting from the agitation of the material.

Among the problems with commercially available sealing units are the inability to compensate for eccentricity of the feed screw hub and eccentric feed screw rotation due to the weight of the feed screw. Another problem is that the lips of the sealing unit can be damaged as the feed screw is inserted for passage through the sealing unit. In addition, failures of the sealing unit can occur because of the heat caused by the contact surfaces of the lips of the sealing unit, in some applications reaching 200 degrees F.

SUMMARY OF THE INVENTION

A sealing unit, constructed in accordance with the present invention, includes a housing having a generally cylindrical axial bore extending between first and second end faces of the housing and a rotary ring fitted within the bore of the housing for rotary and limited axial movement relative to the housing and having first and second grooves in an inside surface thereof. This sealing unit also includes first and second flexible rings fitted in the first and second grooves, respectively, of the rotary ring for imparting rotary movement to the rotary ring upon rotary movement of the first and second flexible rings. The first and the second flexible rings are adapted to receive a rotating shaft which imparts rotary movement to the first and the second flexible rings. A sealing unit, constructed in accordance with the present invention, further includes first and second seal face rings fixed to the housing within the bore of the housing against radial movement relative to the housing and disposed at opposite faces of the rotary ring for sliding contact with the rotary ring as the rotary ring undergoes rotary movement. The faces of the first and the second seal face rings which are in sliding contact with the rotary ring have a mineral filled low friction layer. Also included in this sealing unit are means for urging the first and the second seal face rings into sliding contact with the rotary ring.

Although the invention is particularly suited for use in sealing the opening through which a feed screw of materials feeder passes into a bowl which contains material, the invention has broader application and can be used in other equipment having generally similar requirements.

BRIEF DESCRIPTION OF THE DRAWING

The single FIGURE is a cross-sectional view of a sealing unit constructed in accordance with the present invention.

DETAILED DESCRIPTION OF THE INVENTION

Referring to the drawing, a sealing unit, constructed in accordance with the present invention, includes a housing 10 having a generally cylindrical axial bore 12 extending between first and second end faces 14 and 16 of the housing. For the embodiment of the invention being described, bore 12 is stepped having a first inside diameter along inside surface 12a and a second inside diameter along inside surface 12b. Housing 10 has a circular channel 18 extending axially of the housing and concentric with bore 12 of the housing.

For the embodiment of the invention being described, housing 10 is composed of first and second parts 10a and 10b joined together with the first part 10a of the housing press fit into the second part 10b of the housing. Circular channel 18 in housing 10 is defined by the first part 10a of the housing and the second part 10b of the housing. In other embodiments of the invention, housing 10 may be fabricated as a single part.

Housing 10 has a passage 19 extending from the outside surface of the housing to circular channel 18 in housing. For the two-part housing being described, passage 19 is defined by the first part 10a of the housing and the second part 10b of the housing. Passage 19 in housing 10 serves to permit air to enter into channel 18 to cool the various components of the sealing unit and prevent the temperature of the sealing unit from rising to undesirably high levels. Flexible rings 20 and 21 provide a static seal so that the air introduced to circular channel 18 flows through the circular channel rather than along the outside of housing 10.

A sealing unit, constructed in accordance with the present invention, also includes a rotary ring 22 fitted within bore 12 of housing 10 for rotary and limited axial movement relative to the housing and having first and second grooves 24 and 26 in an inside surface thereof. The outside diameter of rotary ring 22 and the inside diameter of bore 12 of housing 10 are sized to permit limited radial movement of the rotary ring within the housing. As a result, rotary ring 22 floats within bore 12 of housing 10.

A sealing unit, constructed in accordance with the present invention, further includes first and second flexible rings 28 and 30 fitted in first and second grooves 24 and 26, respectively, of rotary ring 22 for imparting rotary movement to the rotary ring upon rotary movement of the first and the second flexible rings. First and second flexible rings 28 and 30 are adapted to receive a rotating shaft, for example a feed screw of a materials feeder, which imparts rotary movement to the first and the second flexible rings which causes rotary ring 22 to undergo rotary movement. Flexible rings 28 and 30 also provide a static seal between rotary ring 22 and the rotating shaft. Because rotary ring 22 floats within bore 12 of housing 10, the rotary ring is self-aligning as a shaft is received by flexible rings 28 and 30.

Also included in a sealing unit, constructed in accordance with the present invention, are first and second seal face rings 32 and 34 fixed to housing 10 within bore 12 of the housing against radial and rotary movement relative to the housing. First and second seal face rings 32 and 34 are disposed at opposite faces of rotary ring 22 for sliding contact with the rotary ring as the rotary ring undergoes rotary movement. First seal face ring 32 is fixed to housing 10 for limited axial movement relative to the housing.

The faces of first and second seal face rings 32 and 34 in sliding contact with rotary ring 22 are of a mineral filled low friction material, for example a Teflon type of material. The relatively low friction at the contacting surfaces of rotary ring 22 and first and second seal face rings 32 and 34 avoids the need of a lubricant. Abrasive materials which migrate between rotary ring 22 and first and second seal face rings 32 and 34 tend to embed in the mineral filled low friction layers rather than destroy these layers.

A sealing unit, constructed in accordance with the present invention, further includes means for urging first and second seal face rings 32 and 34 into sliding contact with rotary ring 22. Such means include, for the embodiment of the invention being described, a compression spring 36 disposed to one side of first seal face ring 32 in circular channel 18 of housing 10, a first support ring 38 bearing against and fixed to first seal face ring 32 and fixed to housing 10 in the circular channel against rotary movement by a screw 39, and a second support ring 40 bearing against and fixed to second seal face ring 34 and fixed to the housing against rotary movement by a screw 42. Although first seal face ring 32 is fixed to housing 10 against rotary movement by screw 39 which extends through the first support ring, the first seal face ring can undergo limited axial movement relative to the housing. First support ring 38 is fixed to first seal face ring 32 and second support ring 40 is fixed to second seal face ring 34 by, for example, suitable keying arrangements. Screw 39 is arranged in a slide in housing 10 to permit first support ring 38 and first seal face ring 32 to which first support ring 38 is fixed to undergo limited movement axially of the housing. Compression spring 36 is disposed between first support ring 38 and the opposite end of circular channel 18 of housing 10 and bears against the first support ring. Preferably, screw 42 and the hole in housing 10 in which the screw is received are dimensioned to permit limited pivotal movement of second support ring 40 about an axis perpendicular to the longitudinal axis of bore 12 of housing 10. This facilitates introduction of a shaft into bore 12 of housing 10 in that second support ring is free to pivot to a limited extent and adjust to a shaft which is introduced off the axis of the bore in the housing.

The sliding contact between the rotary ring 22 and the surfaces of seal face rings 32 and 34 of a mineral filled low friction material is established and maintained by compression spring 36. Compression spring 36, bearing against first support ring 38, urges the first support ring, which is permitted to undergo limited movement axially of the housing, against first seal face ring 32. A flexible ring 44 serves as a static sliding seal which prevents material from passing from bore 12 to the area of compression spring 36. First seal face ring 32, in turn, is urged into sliding contact with rotary ring 22. Rotary ring 22, which is fitted in housing 10 for limited axial movement relative to the housing, in turn, is urged against second seal face ring 34 which is fixed to second support ring 40 which is fixed to the housing.

While in the foregoing there have been described preferred embodiments of the present invention, it should be understood by those skilled in the art that various modifications and changes can be made without departing from the true spirit and scope of the present invention.

What is claimed:

1. A sealing unit comprising:
   a housing having a generally cylindrical axial bore extending between first and second end faces of said housing;
   a rotary ring fitted within said bore of said housing for rotary and limited axial and radial movement relative to said housing and having first and second grooves in an inside surface thereof;
   first and second flexible rings fitted in said first and said second grooves, respectively, of said rotary ring for imparting rotary movement to said rotary ring upon rotary movement of said first and said second flexible rings, said first and said second flexible rings adapted to receive a rotating shaft which imparts rotary movement to said first and said second flexible rings;
   a first seal face ring fixed to said housing within said bore of said housing for limited axial movement relative to said housing and against radial and rotary movement relative to said housing and disposed at a first face of said rotary ring for sliding contact with said rotary ring as said rotary ring undergoes rotary movement, the face of said first seal face ring in sliding contact with said rotary ring having a mineral filled low friction layer;
   a second seal face ring fixed to said housing within said bore of said housing against radial, axial and rotary movement relative to said housing and disposed at a second face of said rotary ring for sliding contact with said rotary ring as said rotary ring undergoes rotary movement, the face of said second seal face ring in sliding contact with said rotary ring having a mineral filled low friction layer; and
   means for urging said first and said second seal face rings into sliding contact with said rotary ring.

2. A sealing unit according to claim 1 wherein said means for urging said first and said second seal face rings into sliding contact with said rotary ring include a compression spring disposed to one side of said first seal face ring.

3. A sealing unit according to claim 2 wherein:
   (a) said housing has a circular channel extending axially of said housing and concentric with said bore of said housing, and
   (b) said compression spring is disposed in said circular channel.

4. A sealing unit according to claim 3 wherein said housing is composed of first and second parts joined together with said first part of said housing press fit into said second part of said housing and said circular channel in said housing is defined by said first part and said second part of said housing.

5. A sealing unit according to claim 4 wherein said housing has a passage extending from the outside surface of said housing to said circular channel in said housing.

6. A sealing unit according to claim 2 wherein:
   (a) said means for urging said first and said second seal face rings into sliding contact with said rotary ring include:
      (1) a first support ring bearing against and fixed to said first seal face ring and fixed to said housing against rotary movement but permitted to undergo limited movement axially of said housing, and
      (2) a second support ring bearing against and fixed to said second seal face ring and fixed to said housing against rotary movement, and (b) said compression spring bears against said first support ring.

7. A sealing unit according to claim 6 wherein said second support ring is fixed to said housing for limited pivotal movement about an axis perpendicular to the longitudinal axis of said bore of said housing.

8. A sealing unit according to claim 1 wherein said housing has:
   (a) a circular channel extending axially of said housing and concentric with said bore of said housing, and
   (b) a passage extending from the outside surface of said housing to said circular channel.

9. A shaft sealing unit assembly comprising:
   a housing having a generally cylindrical axial bore extending between first and second end faces of said housing;
   a rotary ring fitted within said bore of said housing for rotary and limited axial and radial movement relative to said housing and having first and second grooves in an inside surface thereof;
   first and second flexible rings fitted in said first and said second grooves, respectively, of said rotary ring for imparting rotary movement to said rotary ring upon rotary movement of said first and said second flexible rings;
   a first seal face ring fixed to said housing within said bore of said housing for limited axial movement relative to said housing and against radial and rotary movement relative to said housing and disposed at a first face of said rotary ring for sliding contact with said rotary ring as said rotary ring undergoes rotary movement, the face of said first seal face ring in sliding contact with said rotary ring having a mineral filled low friction layer;
   a second seal face ring fixed to said housing within said bore of said housing against radial, axial and rotary movement relative to said housing and disposed at a second face of said rotary ring for sliding contact with said rotary ring as said rotary ring undergoes rotary movement, the face of said second seal face ring in sliding contact with said rotary ring having a mineral filled low friction layer;
   means for urging said first and said second seal face rings into sliding contact with said rotary ring; and
   a shaft received by said first and said second flexible rings which imparts rotary movement to said first and said second flexible rings.

10. A sealing unit comprising:
    a housing composed of first and second parts joined together with said first part press fit into said second part and having:
      (a) a generally cylindrical axial bore extending between first and second end faces of said housing,
      (b) a circular channel extending axially of said housing and concentric with said bore of said housing and defined by said first and said second parts of said housing, and
      (c) a passage extending from the outside surface of said housing to said circular channel and defined by said first and said second parts of said housing;
    a rotary ring fitted within said bore of said housing for rotary and limited axial and radial movement relative to said housing and having first and second grooves in an inside surface thereof;
    first and second flexible rings fitted in said first and said second grooves, respectively, of said rotary ring for imparting rotary movement to said rotary ring upon rotary movement of said first and said second flexible rings, said first and said second flexible rings adapted to receive a rotating shaft which imparts rotary movement to said first and said second flexible rings;
    a first seal face ring fixed to said housing within said bore of said housing for limited axial movement relative to said housing and against radial and rotary movement relative to said housing and disposed at a first face of said rotary ring for sliding contact with said rotary ring as said rotary ring undergoes rotary movement, the face of said first seal face ring in sliding contact with said rotary ring having a mineral filled low friction layer;
    a second seal face ring fixed to said housing within said bore of said housing against radial and rotary movement relative to said housing and disposed at a second face of said rotary ring for sliding contact with said rotary ring as said rotary ring undergoes rotary movement, the face of said second seal face ring in sliding contact with said rotary ring having a mineral filled low friction layer; and
    means, including a compression spring disposed in said circular channel in said housing to one side of said first seal face ring, for urging said first and said second seal face rings into sliding contact with said rotary ring.

11. A sealing unit according to claim 10 wherein:
    (a) said means for urging said first and said second seal face rings into sliding contact with said rotary ring include:
      (1) a first support ring bearing against and fixed to said first seal face ring and fixed to said housing in said circular channel against rotary movement but permitted to undergo limited movement axially of said housing, and
      (2) a second support ring bearing against and fixed to said second seal face ring and fixed to said housing against rotary movement, and
    (b) said compression spring is disposed between said first support ring and an end of said circular channel and bears against said first support ring.

12. A sealing unit according to claim 11 wherein said second support ring is fixed to said housing for limited pivotal movement about an axis perpendicular to the longitudinal axis of said bore of said housing.

13. A sealing unit comprising:
    a housing having:
      (a) a generally cylindrical axial bore extending between first and second end faces of said housing;
      (b) a circular channel extending axially of said housing and concentric with said bore of said housing, and
      (c) a passage extending from the outside surface of said housing to said circular channel;
    a rotary ring fitted within said bore of said housing for rotary and limited axial and radial movement relative to said housing and having first and second grooves in an inside surface thereof;
    first and second flexible rings fitted in said first and said second grooves, respectively, of said rotary ring for imparting rotary movement to said rotary ring upon rotary movement of said first and said second flexible rings, said first and said second flexible rings adapted to receive a rotating shaft which imparts rotary movement to said first and said second flexible rings;

first and second seal face rings fixed to said housing within said bore of said housing against radial and rotary movement relative to said housing and disposed at opposite faces of said rotary ring for sliding contact with said rotary ring as said rotary ring undergoes rotary movement, the faces of said first and said second seal face rings in sliding contact with said rotary ring having a mineral filled low friction layer; and means for urging said first and said second seal face rings into sliding contact with said rotary ring.

* * * * *